United States Patent [19]

Patel

[11] Patent Number: 5,653,797
[45] Date of Patent: Aug. 5, 1997

[54] READY MIXED SETTING-TYPE JOINT COMPOUND AND METHOD OF MAKING SAME

[75] Inventor: Jashbhai M. Patel, Amherst, N.Y.

[73] Assignee: National Gypsum Company, Charlotte, N.C.

[21] Appl. No.: 638,190

[22] Filed: Apr. 26, 1996

[51] Int. Cl.$^6$ .................... C04B 11/00; C09J 5/00
[52] U.S. Cl. .................... 106/781; 106/778; 106/783; 52/741.4; 524/5
[58] Field of Search .................... 106/778, 781, 106/783; 52/741.4; 524/5

[56] References Cited

U.S. PATENT DOCUMENTS

| | | | |
|---|---|---|---|
| Re. 29,753 | 9/1978 | Williams | 106/85 |
| 2,292,616 | 8/1942 | Dailey | 106/112 |
| 2,460,267 | 2/1949 | Haddon | 106/111 |
| 2,868,752 | 1/1959 | Frazier | 260/29.6 |
| 2,868,753 | 1/1959 | Morgan et al. | 260/29.6 |
| 2,962,458 | 11/1960 | Bird et al. | 260/8 |
| 3,035,940 | 5/1962 | Hobson | 117/104 |
| 3,121,702 | 2/1964 | Sherr et al. | 260/1 |
| 3,256,223 | 6/1966 | Heijmer | 260/22 |
| 3,297,601 | 1/1967 | Maynard et al. | 260/17.4 |
| 3,303,147 | 2/1967 | Elden | 260/8 |
| 3,304,189 | 2/1967 | Kuntze | 106/111 |
| 3,346,487 | 10/1967 | Irami et al. | 252/8.5 |
| 3,346,488 | 10/1967 | Lyons et al. | 252/8.5 |
| 3,520,708 | 7/1970 | Chambers et al. | 106/110 |
| 3,544,344 | 12/1970 | Pratt et al. | 106/111 |
| 3,597,251 | 8/1971 | Kaufman | 106/306 |
| 3,598,621 | 8/1971 | Ferrara et al. | 106/111 |
| 3,619,221 | 11/1971 | Kossivas | 106/90 |
| 3,624,018 | 11/1971 | Eilers et al. | 260/29.6 E |
| 3,661,610 | 5/1972 | Ferris | 106/306 |
| 3,689,295 | 9/1972 | Hersey et al. | 106/90 |
| 3,794,506 | 2/1974 | Schmidt et al. | 106/90 |
| 3,797,610 | 3/1974 | Windle | 106/306 |
| 3,839,260 | 10/1974 | Eilers et al. | 260/31.2 N |
| 3,839,262 | 10/1974 | Eilers et al. | 260/32.6 N |
| 3,839,263 | 10/1974 | Eilers et al. | 260/33.2 R |
| 3,869,415 | 3/1975 | Williams | 106/778 |
| 3,885,985 | 5/1975 | Serafin et al. | 106/315 |
| 3,936,313 | 2/1976 | Ericson | 106/197 R |
| 3,941,772 | 3/1976 | Ploger et al. | 260/239 B |
| 3,945,843 | 3/1976 | Holty et al. | 166/308 M |
| 3,973,978 | 8/1976 | Nakagawa et al. | 106/95 |
| 3,984,269 | 10/1976 | Schneller et al. | 156/71 |
| 3,989,195 | 11/1976 | Falcon-Steward | 241/16 |
| 4,042,409 | 8/1977 | Terada et al. | 106/111 |
| 4,157,264 | 6/1979 | Kennedy-Skipton | 106/111 |
| 4,166,751 | 9/1979 | Komeiji et al. | 106/112 |
| 4,190,454 | 2/1980 | Yamagisi et al. | 106/90 |
| 4,210,455 | 7/1980 | Metcalf et al. | 106/90 |
| 4,236,849 | 12/1980 | Kennedy-Skipton | 405/261 |
| 4,242,318 | 12/1980 | Brahm et al. | 423/430 |
| 4,264,368 | 4/1981 | Schutz | 106/90 |
| 4,286,992 | 9/1981 | Galer et al. | 106/90 |

(List continued on next page.)

FOREIGN PATENT DOCUMENTS

| | | | |
|---|---|---|---|
| 886330 | 5/1981 | Belgium . | |
| 166798 | 1/1986 | European Pat. Off. . | |
| 2057918 | 5/1971 | France . | |
| 2125733 | 9/1972 | France . | |
| 2364869 | 4/1978 | France . | |
| 2474479 | 7/1981 | France . | |
| 2513623 | 9/1983 | France . | |
| 2692605 | 12/1993 | France . | |
| 1232051 | 1/1967 | Germany . | |
| 2409116 | 10/1974 | Germany . | |
| 2325738 | 12/1974 | Germany | 106/778 |
| 2937835 | 4/1981 | Germany . | |
| 54-141819 | 11/1979 | Japan . | |
| 55-095691 | 7/1980 | Japan | 106/781 |
| 56-76328 | 6/1981 | Japan . | |
| 59-156950 | 6/1984 | Japan . | |
| 60-127256 | 7/1985 | Japan | 106/778 |
| 61-31335 | 2/1986 | Japan . | |
| 63-116806 | 5/1988 | Japan . | |
| 577186 | 10/1977 | U.S.S.R. | 106/778 |
| 726307 | 4/1980 | U.S.S.R. . | |
| 985257 | 1/1983 | U.S.S.R. . | |
| 1051229 | 10/1983 | U.S.S.R. . | |
| 1111711 | 5/1968 | United Kingdom | 106/778 |
| 1325543 | 8/1973 | United Kingdom . | |
| 1325544 | 8/1973 | United Kingdom . | |
| 1390360 | 4/1975 | United Kingdom . | |
| 1538102 | 1/1979 | United Kingdom . | |
| 1538103 | 1/1979 | United Kingdom . | |
| 2132599 | 7/1984 | United Kingdom . | |
| 2168695 | 6/1988 | United Kingdom . | |

OTHER PUBLICATIONS

Chemical Abstract, vol. 102, No. 10, Abstract No. 83476h (1985). no month

Chemical Abstract, vol. 105, No. 2, Abstract No. 11015w (1986). no month.

Chemical Abstract, vol. 94, No. 22, Abstract No. 179611v (1981) no month.

Betonwerk–Fertigteil–Technik, Heft, Aug. 1972, pp. 571–580 (with English abstract).

Colloids, Inc., Material Safety Data Sheet, pp. 1–2, Oct. 1, 1987.

Colloid 230 Product Sheet (undated).

(List continued on next page.)

Primary Examiner—Anthony Green
Attorney, Agent, or Firm—Marshall, O'Toole, Gerstein, Murray & Borun

[57] ABSTRACT

A process for the production of a ready-mixed setting-type joint compound includes the use of calcium sulfate hemihydrate, water, and a set-retarding agent. The retarder includes a polymer composition including acrylic acid and acrylamide monomer units, for example a copolymer (or a mixture of copolymers) of acrylic acid and acrylamide or a blend of a homopolymer of acrylic acid and a homopolymer of acrylamide. The joint compound can be combined with an accelerator including a metallic salt. The joint compound of the invention can be formulated either as a lightweight joint compound or as a conventional weight joint compound. The joint compounds provide short setting times, reduced shrinkage, reduced preparation time, and beneficial application properties.

27 Claims, No Drawings

U.S. PATENT DOCUMENTS

| | | | |
|---|---|---|---|
| 4,293,344 | 10/1981 | Joseph | 106/778 |
| 4,337,094 | 6/1982 | Tokar | 106/90 |
| 4,340,525 | 7/1982 | Hübner et al. | 252/8.55 B |
| 4,401,473 | 8/1983 | Kleiner et al. | 106/109 |
| 4,424,290 | 1/1984 | Rousset et al. | 524/5 |
| 4,454,267 | 6/1984 | Williams | 524/43 |
| 4,455,171 | 6/1984 | Spensley et al. | 106/104 |
| 4,461,644 | 7/1984 | Childs et al. | 106/76 |
| 4,466,835 | 8/1984 | Crump et al. | 106/90 |
| 4,466,836 | 8/1984 | Crump et al. | 106/90 |
| 4,468,252 | 8/1984 | Crump et al. | 106/90 |
| 4,472,200 | 9/1984 | Crump et al. | 106/90 |
| 4,473,405 | 9/1984 | Gerber | 106/90 |
| 4,494,990 | 1/1985 | Harris | 106/90 |
| 4,500,356 | 2/1985 | Crump et al. | 106/90 |
| 4,518,652 | 5/1985 | Willoughby | 428/312.4 |
| 4,582,139 | 4/1986 | Childs et al. | 166/293 |
| 4,606,770 | 8/1986 | Gerber | 106/90 |
| 4,612,333 | 9/1986 | Vassileff | 521/83 |
| 4,645,548 | 2/1987 | Take et al. | 156/39 |
| 4,655,838 | 4/1987 | Koga et al. | 106/90 |
| 4,661,161 | 4/1987 | Jakacki et al. | 106/112 |
| 4,676,832 | 6/1987 | Childs et al. | 106/90 |
| 4,680,396 | 7/1987 | Crump et al. | 544/337 |
| 4,681,634 | 7/1987 | Roca et al. | 106/90 |
| 4,683,003 | 7/1987 | Nakano et al. | 106/86 |
| 4,700,780 | 10/1987 | Brothers | 166/293 |
| 4,724,242 | 2/1988 | Vassileff | 521/83 |
| 4,804,688 | 2/1989 | Vassileff | 521/64 |
| 4,846,889 | 7/1989 | Meyer | 106/115 |
| 4,891,072 | 1/1990 | Cooper | 106/90 |
| 4,964,917 | 10/1990 | Bobrowski et al. | 106/804 |
| 5,075,358 | 12/1991 | Riley et al. | 524/5 |
| 5,079,042 | 1/1992 | Frings | 106/778 |
| 5,093,410 | 3/1992 | Kambayashi et al. | 524/566 |
| 5,151,130 | 9/1992 | Croft et al. | 106/778 |
| 5,203,919 | 4/1993 | Bobrowski et al. | 106/802 |
| 5,273,579 | 12/1993 | Tanaka et al. | 106/715 |
| 5,277,712 | 1/1994 | McInnis | 106/778 |
| 5,336,318 | 8/1994 | Attard et al. | 106/778 |
| 5,427,617 | 6/1995 | Bobrowski et al. | 106/802 |

OTHER PUBLICATIONS

Technical Bulletin, "Coatings, Inks, Adhesives, and Construction Technology", (undated).

Rhone–Poulenc Specialty Chemicals Division, Material Safety Data Sheet, Colloid 231, pp. 1–3 (undated).

United States Gypsum Company Product Bulletin, pp. 2–7, 1988 no month.

Kirk–Othmer Encyclopedia of Chemical Technology, vol. 21, pp. 621–624, 1970 no month.

Kirk–Othmer Encyclopedia of Chemical Technology, vol. 4, 4th Edition, pp. 812–826, 1992 no month.

Gypsum Products, Chapter 5, pp. 89–125 (undated).

Joseph Karni, Materials and Structures, "Gypsum in Construction: Origin and Properties," 1995, pp. 92–100 no month.

Chemical Abstract No. 66:79297 which is an abstract of German Patent Specification No. 1,232,051 (Jan. 1967).

Chemical Abstract No. 104:212148 which is an abstract of Japanese Patent Specification No. 61–031335 (Feb. 1986).

Chemical Abstract No. 115:34420 which is an abstract of Japanese Patent Specification No. 2–279548 (Nov. 1990).

WPIDS Abstract No. 68–75503P which is an abstract of German Patent Specification No. 1,232,051 (Jun. 1964).

WPIDS abstract No. 88–179406 which is an abstract of Japanese Patent Specification No. 63–116806 (May 1988).

WPIDS abstract No. 94–028260 which is an abstract of French Patent Specification No. 2,692,605 (Dec. 1993).

READY MIXED SETTING-TYPE JOINT COMPOUND AND METHOD OF MAKING SAME

BACKGROUND OF THE INVENTION

1. Field of the Invention

The present invention relates generally to the production and use of cementitious compositions, and more particularly the production of compounds for use in filling and coating joints between adjacent gypsum wallboard sheets, as well as for repairing other imperfections in building materials. The invention further relates to the preparation and use of setting-type joint compounds which can be pre-mixed with water and stored over substantial periods of time prior to use in concealing the joints between adjacent gypsum wallboard sheets.

2. Description of Related Technology

One of the most common manners today of constructing interior walls includes the use of inorganic wallboard panels or sheets such as gypsum wallboard, often referred to simply as "wallboard" or "drywall." The use of wallboard, as opposed to conventional wet plaster methods, is often desirable because the installation of wallboard is ordinarily less costly than that for conventional plaster. Wallboard is conventionally produced by enclosing a core of an aqueous slurry of gypsum and other materials between two large sheets of paper. After the gypsum slurry has set and dried, the sheet is cut into standard sizes. Gypsum wallboard is described, for example, in the Kirk-Othmer Encyclopedia of Chemical Technology, Second Edition, 1970, Vol. 21, pages 621–24, the disclosure of which is hereby incorporated herein by reference.

A wall is generally made by securing, e.g., with screws and/or nails, the wallboard to a support structure, for example vertically and horizontally oriented pieces of wood. Because wallboard is typically supplied in standard-sized sheets or panels, when forming a wall from the sheets, there will generally be a number of joints between adjacent sheets. In most wallboard construction, it is necessary to conceal these joints between adjacent panels so that the wall will have a smooth finish similar to that obtained with conventional wet plaster methods. It is also typically necessary to conceal the screws and/or nails used to secure the wallboard panels to framing, imperfections in the wallboard panels, as well as other materials (e.g., corner beads) used to form the wall.

The prior art discloses a number of joint compound compositions (sometimes referred to by applicators as "mud") that can be used to conceal the joints between adjacent sheets of wallboard. Such compositions can also be applied to other defects in the wallboard, for example the defects or depressions caused by screws or nails used to hold the wallboard in place.

In order to conceal the joints between wallboard panels, the joint compound is typically applied in several layers or coats. A first coat of joint compound is placed in the joint between the wallboards with a knife, blade, or trowel. The first coat is primarily for the purpose of filling the space between the adjacent wallboards. Joint tape (for example, made of paper) can then be embedded into the first coat of joint compound. It is conventional to apply the joint compound in several coats or layers in order to obtain a smooth finish, and each coat of joint compound must be allowed to dry prior to the placement of the next coat of joint compound. (If the prior coat is not allowed to dry, problems such as excess shrinkage and/or cracking can occur.) Once dry, the treated area is sanded before applying the next coat of joint compound.

Because each coat of joint compound must become substantially completely dry before the subsequent coat can be applied, this can cause undesirable delays in the completion of the wall. Required drying times are often in the range of about twenty-four hours for each coat. Cold, damp weather can make it particularly difficult for the joint compound to dry.

Three coats of joint compound are often required to produce satisfactory results. Once dry, the joints and other treated locations are given a final sanding in order to produce a smooth surface similar to a conventional wet plaster wall prior to painting or other finishing.

The joint compound can be supplied in the form of a dry powder, to which an amount of water is added at the work site by the worker to give the joint compound a suitable consistency. Other joint compounds, often referred to as "ready-mix" or "ready-mixed" joint compounds, are pre-mixed with water during manufacturing. These joint compounds are generally sold in a bucket or pail in a form that is suitable for use with little or no addition of water at the job site. Ready-mixed joint compounds have the advantages of providing a consistent formulation, reduction or elimination of the time necessary to prepare the joint compound composition, and the reduction or elimination of the need to have water available on site.

Among the prior art joint compound compositions, it is known to generally use a filler (e.g., calcium carbonate, calcium sulfate hemihydrate, or calcium sulfate dihydrate) and a binder, as well as various other components to produce a joint compound.

Many joint compounds are of the "drying" type. In a drying-type joint compound, the filler comprises substantially calcium carbonate ($CaCO_3$). Prior to use (generally during manufacturing), the filler and a binder (along with several other known ingredients) are mixed with water. After application, when the water dries, i.e., evaporates, a dry, relatively hard cementitious material is left behind.

In order to avoid various disadvantages of the drying type of joint compound, compounds of the "setting type" have been developed. In setting-type joint compounds, at least a substantial portion of the filler material is calcium sulfate hemihydrate ($CaSO_4 \cdot \frac{1}{2}H_2O$, also referred to as calcined gypsum). In order to produce calcined gypsum, one converts calcium sulfate dihydrate from raw gypsum to the hemihydrate state through a known process called calcination. This process removes 1 ½ molecules of water from the calcium sulfate dihydrate gypsum. The hemihydrate form of calcium sulfate is substantially more soluble in water than the dihydrate form of calcium sulfate.

During use in a setting joint compound, the calcium sulfate hemihydrate is rehydrated to the dihydrate state. This rehydration process normally takes place over a fairly short period of time. Accordingly, it has been extremely difficult to produce a joint compound comprising hemihydrate gypsum because the product would set in the bucket. Thus, joint compounds of the setting type have generally had to be supplied in the powder form. Setting joint compounds have the advantage of having generally quicker finishing times (setting time) than drying joint compounds. This is advantageous for the reasons stated above. Further, because setting joint compounds form a crystalline network upon setting (as opposed to merely drying), these compounds typically provide a stronger, more durable bond between adjacent wallboard sheets than do drying type joint compounds.

At least one ready-mixed setting joint compound has been disclosed in the literature. For example, U.S. Pat. No. 4,661,161 to Jakacki et al. discloses a setting-type joint compound comprising an aqueous slurry of calcium sulfate hemihydrate and a set retarding agent formed of two ingredients: an organic, proteinaceous retarder and a chelating agent, e.g., selected from diethylene triamine pentaacetic acid, ethylene diamine tetraacetic acid, and salts thereof.

However, it is believed that joint compounds of the setting, ready-mix type have not been successfully commercially employed due to the need to find a suitable retarding agent and a suitable accelerator to overcome the retarding agent.

Others have disclosed using retarding agents for certain purposes. However, although various types of retarders have been suggested, the purpose of the retarders, the final product, and the conditions under which the product is used (e.g., in wallboard manufacturing), have differed substantially from the purpose, production conditions, and working conditions of joint compounds.

For example, although wallboard manufacturers have used certain types of retarding agents, the purpose in that application is to prevent the immediate absorption of water and stiffening of the slurry during production, as well as to facilitate control of the slurry. In wallboard production, retarding agents are added to stabilize a stucco slurry for only a matter of seconds. It is understood that retarding agents are typically used in wallboard production at an extremely low rate, for example at about 0.0007 weight percent (e.g., in a 1400 pound batch, about 30 grams of retarder could typically be added).

Accordingly, for the reasons stated above, it would be desirable to produce a joint compound of the ready-mixed type that is also of the setting type and which is storage stable for periods required for commercial use. It would also be desirable to produce a ready-mix joint compound that provides improved application characteristics, crack resistance, and less shrinkage compared to conventional ready mixed and powder joint compounds.

It would be further desirable to produce a ready-mixed joint compound which allows for reduced times between applications of successive coats, and which can in some cases reduce the number of required coats.

It would be still further advantageous if the aforementioned joint compounds could be made in the form of conventional weight joint compounds and of the lightweight type.

The compositions of the present invention solve or improve each of the deficiencies in the above-described prior art compositions and methods.

SUMMARY OF THE INVENTION

It is an object of the invention to overcome one or more of the problems described above.

Accordingly, the invention provides a process for producing a ready mix joint compound including combining calcium sulfate hemihydrate, water, and a set-retarding agent. Other known ingredients, such as fillers, thickeners, and preservatives, are also preferably included. The retarder includes a polymer composition including acrylic acid and acrylamide monomer units, for example a copolymer (or a mixture of copolymers) of acrylic acid and acrylamide or a blend of a homopolymer of acrylic acid and a homopolymer of acrylamide.

The joint compound of the invention can be formulated either as a lightweight joint compound or as a conventional weight joint compound.

According to one feature of the invention, the inventive joint compound is combined with a promoter or accelerator just prior to use, e.g. application on a wall or ceiling. The accelerator, which overcomes the effect of the retarding agent, preferably includes a metallic salt that provides an acidic cation. According to a further feature of the invention, the joint compound is utilized without the addition of an accelerator. In this embodiment, the joint compound acts as a drying type ready mixed joint compound.

Other objects and advantages of the invention will be apparent to those skilled in the art from the following detailed description, taken in conjunction with the appended claims.

DETAILED DESCRIPTION OF A PREFERRED EMBODIMENT

According to the invention, there are provided compositions suitable for filling and coating imperfections in building materials, such as the joints between adjacent panels of gypsum wallboard. The invention further provides a method of preparation and use of setting-type joint compounds that can be pre-mixed by a manufacturer with water and stored over substantial periods of time prior to use in concealing the joints between adjacent wallboard panels. A ready-mixed setting type joint compound can be made by incorporating a copolymer of acrylic acid and acrylamide as a retarding agent.

The inventive joint compound preferably has a shelf life of about two years. As used herein, the term "shelf life" is meant to refer to the time that elapses between the manufacturing of the joint compound (including mixing of calcined gypsum and water) and the point when dihydrate crystals have formed and have interlocked to the stage where the composition is not suitable for high quality finishing.

The term "setting time" is meant to refer to the time that elapses between the initial application of the joint compound and the point when the joint compound has "set," as described above, wherein the joint compound is substantially dry, dihydrate crystals have sufficiently formed and have interlocked, and a subsequent coat of joint compound can satisfactorily be applied over a previous coat.

The term "open time" as used herein is meant to refer to the time that elapses between (a) the exposure to the atmosphere of a joint compound that is ready to apply to a wall (e.g., opening of the bucket or pail containing the ready-mixed joint compound) and (b) the point where the calcined gypsum of the joint compound has reacted sufficiently with the water present so that the joint compound is no longer satisfactory for application to a wallboard joint to produce a high quality finish. The shelf life, setting time, and open time of the inventive joint compounds can be measured by conventional procedures.

The joint compound of the invention includes several preferred ingredients or components that are combined to form a useful composition.

The first ingredient of the joint compound of the invention is calcium sulfate hemihydrate ($CaSO_4 \cdot H_2O$). As is known by those of skill in the art, there are two types of calcium sulfate hemihydrate, the $\alpha$-hemihydrate form and the $\beta$-hemihydrate form. These two forms are typically produced by different types of calcination processes and differ structurally. For example, when gypsum is calcined by the wet or kettle process, the $\alpha$-hemihydrate form is obtained. The $\beta$-hemihydrate form can be obtained by calcination in a process referred to as dry calcination, for example, one of the following processes: kettle, rotary, kiln, calcidyne, imp mill calcination, caludis peter, and holflit.

Although those of skill in the art will know how to produce both forms of calcium sulfate hemihydrate by dehydrating gypsum, the following is a general description of a preferred process for producing the α-hemihydrate form. Gypsum rock raw material is processed in an autoclave with the spraying of water and injection of liquid alum (about 0.1 percent solution) in order to adjust the pH. The material is subjected to an elevated pressure of about 30 psi and elevated temperature for about one-half hour. α-calcium sulfate hemihydrate (sometimes referred to as "stucco") is thus formed.

This product is dried to a temperature greater than about 220° F. (about 104° C.) in a high speed dryer, so that the product will not reabsorb any of the free or ambient water. The dried rock is then ground in a mill to produce a desired particle size of α-calcium sulfate hemihydrate, and stored in vented silos for use. It may be advantageous in some applications of the invention to use particle sizes smaller than 120 mesh or smaller than 100 mesh (ASTM standard).

The BET surface area of α-hemihydrate is preferably low, for example in the range of about 1 to about 2.5 m²/g. β-hemihydrate, on the other hand, has a much higher BET surface area, generally in the range of about 8 to about 12 m²/g. The water demand for α-hemihydrate is in the range of 30 to 45 milliliters per 100 grams, whereas the water demand for βhemihydrate is much higher, in the range of 60 to about 85 milliliters per 100 grams. Additional description of calcium sulfate can be found in the Kirk-Othmer Encyclopedia of Chemical Technology, Fourth Edition, 1992, Vol. 4, pages 812–826 (Petersen et al.) and Karni et al., Materials and Structures, Vol. 28, pages 92–100 (1995), the disclosures of which are hereby incorporated herein by reference.

The inventive joint compound can utilize either the α-hemihydrate form or the β-hemihydrate form of calcium sulfate. The α-hemihydrate form, which has a relatively low water demand, is preferably used in the production of higher strength joint compounds. Because α-hemihydrate and β-hemihydrate differ in physical properties (as a result of the different manufacturing processes), joint compounds including these forms can have different properties. Those of skill will be able to make modifications based on the disclosure of the invention.

The inventive joint compound can also include one or more secondary fillers such as mica, talc, and various clays, including pyrophylite, sericite, and/or diatomaceous earth. Limestone, another secondary filler, preferably has a particle size in the range of about 20 to about 25 microns.

As stated above, the inventive setting joint compound includes an agent to retard the setting thereof. The retarding agent of the invention is a polymer composition that includes acrylic acid and acrylamide monomer units, for example (a) a copolymer (or a mixture of copolymers) of acrylic acid and acrylamide or (b) a blend of a homopolymer of acrylic acid and a homopolymer of acrylamide. Thus, when the terms polymer composition and/or retarding agent are used herein, it is intended to refer to either (a) the copolymer(s) or (b) the blend of homopolymers mentioned above, including mixtures thereof.

The retarding agent is preferably included in the joint compound at a rate in the range of about 0.6 to about 4 weight percent based on the total weight of calcium sulfate hemihydrate in the joint compound formulation, and more preferably in the range of about 0.6 to about 1.4 weight percent. The retarding agent is most preferably included at a rate of at least about 0.8 weight percent based on the total weight of the calcium sulfate hemihydrate in the joint compound formulation, in order to provide the maximum benefits.

The preferred retarding agent for the invention is sold under the trade name Colloid 231 by Rhône-Poulenc Inc. of Danbury, Conn., the product data bulletin and material data safety sheets of which are hereby incorporated herein by reference. Colloid 231 has a molecular weight of about 4300 and a specific gravity of about 1.3° at 25° C. A less preferred, but useful, retarding agent is sold under the trade name Colloid 230 by Rhône-Poulenc Inc. Colloid 231 is preferred over Colloid 230 because Colloid 231 has a higher potency. Other copolymer solutions include Colloid 211 and Colloid 107 sold by Rhône-Poulenc Inc., as well as Acumer 9141 sold by Rhome & Haas Co. of Philadelphia, Pa. The molecular weight of the retarding agent copolymer is preferably in the range of about 1700 to about 6500.

The retarding agent including both acrylic acid and acrylamide monomer units (either a copolymer or blend of homopolymers) preferably includes about 50 to about 99.9 percent acrylic acid and about 0.1 to about 50 percent acrylamide by weight, and more preferably about 95 to about 98 weight percent acrylic acid and about 1 to about 5 weight percent acrylamide, and most preferably about 95 to about 98 weight percent acrylic acid and about 1 to about 2 weight percent acrylamide.

Where the retarding agent is a blend of a homopolymer of acrylic acid and a homopolymer of acrylamide, the composition preferably includes (a) low molecular weight polyacrylic acid having a molecular weight in the range of about 1500 to about 5000 and (b) polyacrylamide having a molecular weight in the range of about 1500 to about 7000.

While the invention is not limited to any particular mechanism, it is believed that the retarding agent is adsorbed on the surface of the hemihydrate sulfates, preventing any reaction between the hemihydrate sulfates and water present in the ready mix composition. Use of the retarder is also advantageous because in manufacturing it will prevent the joint compound mix from setting up in the mixer or in the piping used in commercial operations.

It has also been found that the acrylamide portion of the retarder of the invention also provides an initial stiff forming effect which helps improve uniform blending and rheology of the joint compound both during manufacturing and during use of the inventive joint compound.

Another ingredient of the preferred joint compound of the invention is a non-leveling agent. Non-leveling agents impart certain rheological properties to the joint compound, including thixotropicity. Non-leveling agents also act as viscosity stabilizers. A preferred non-leveling agent is clay attagel, which is included in the range of about 0.5 to about 5.0 percent based on the total weight of the composition. Other suitable non-leveling agents are known in the art, and include various other clays, including bentonite, as well as clays mixed with starches. Thickeners, such as those described below, also function as non-leveling agents.

The inventive joint compound also preferably includes a thickener. Suitable thickeners include methylcellulose, hydroxy propyl methylcellulose, hydroxyethylcellulose, hydroxyethyl methylcellulose, and sodium carboxymethylcellulose, including combinations thereof. The preferred thickener is Methocel 240S available from Dow Chemical Company of Midland, Mich. Methocel 240S is a hydroxy propyl methylcellulose. The thickener is preferably included in the composition at a rate in the range of about 0.12 to about 1.0 weight percent based on the weight of the total composition.

The joint compound also preferably includes a plasticizer. Plasticizers provide for better adhesion to the substrate in cold weather and are preferably included at about 0.02 to about 1.0 percent based on the total weight of the composition. Useful plasticizers include dibutyl phthalate, which is available from Kalama Chemicals of Seattle, Wash. Dibutyl phthalate is preferably added to the joint compound composition in the range of about 0.2 to about 0.8 weight percent, based on the total weight of the composition. One suitable plasticizer is sold under the trade name Benzoplex by Velsicol Chemical Corp. of Memphis, Tenn.

The inventive setting, ready-mixed joint compound can also include the following ingredients: defoamers, wetting agents, preservatives, fungicides, and binders, in usual amount of about 0.1% to about 50% by weight of the composition.

As mentioned above, in order to promote or accelerate the setting of the ready-mix joint compound, a promoter or accelerator is added to the compound just prior to use. The amount of accelerator is based generally upon the amount of calcium sulfate hemihydrate and retarder in the formulation. The accelerators are preferably added in an amount in the range of about 0.1 to about 5.0 weight percent, and more preferably about 0.1 to about 2.0 weight percent, based on the weight of the calcium sulfate hemihydrate in the joint compound composition. It has been found that when 1.0 weight percent retarder is used, an accelerator having a concentration of at least about 10 mM (millimoles) is preferably used; more preferably, at least about 12.5 mM or at least about 13.5 mM, even more preferably at least about 15 mM, and most preferably about 18 to about 20 mM.

Suitable accelerators include metallic salts that provide acidic cations, such as aluminum sulfate, potassium sulfate, calcium sulfate, ferric sulfate, and ferric chloride. Aluminum sulfate, $Al_2(SO_4)_3$, for example in an aqueous solution having a concentration of about 1 to about 47 weight percent, is the preferred accelerator.

Particularly useful accelerators for commercial scale production include the following: (1) aluminum sulfate (also referred to as "paper maker's alum," "liquid alum," or aluminum sulfate liquid), supplied for example, by Peridot Chemicals Inc. of Wayne, N.J.; Cytec Industries Inc. of West Patterson, N.J.; and Industrial Chemical of Armonk, N.Y.; (2) aluminum potassium sulfate which is a double salt supplied, for example, by the Holland Chemical Company of Adams, Mass.; (3) ferrous sulfate (powder or liquid form); and (4) ferric chloride (powder or liquid form) supplied, for example by the J. T. Baker Chemical Company of Philadelphia, N.J.

Through the addition of cations such as $Al^{+3}$, the calcium sulfate hemihydrate will convert to the dihydrate form. Although the invention is not limited to any particular mechanism, it is believed that the accelerators desorb or neutralize the retarder from the surface of the hemihydrate sulfates, allowing the hemihydrate sulfate to react with water to form calcium sulfate dihydrate, i.e., the hydrated form of calcium sulfate.

Without addition of an accelerating agent, the joint compound of the invention will dry just like a conventional ready-mix joint compound. Thus, a single formulation of the joint compound of the invention can optionally be used as a setting type or drying type joint compound. Even without the use of an accelerator, the inventive joint compound has less shrinkage and is quicker drying than conventional drying type joint compounds. See Table VIII below.

General ranges of ingredients used in an inventive all purpose, conventional-weight joint compound include the ingredients shown in Table I below.

TABLE I

CONVENTIONAL WEIGHT JOINT COMPOUND

| Ingredient | Weight Percentage |
| --- | --- |
| Water | 20–37 |
| Preservatives | 0.02–1.0 |
| Retarder | 0.05–2.0 |
| Calcium Sulfate Hemihydrate | 10–100 |
| Mica (Filler) | 0.5–5.0 |
| Attagel Clay (non-leveling agent) | 0.5–5.0 |
| Cellulose Thickener | 0.12–1.0 |
| Latex (Binder) | 1.0–4.0 |
| Accelerator | 0.01–2.0 |

The inventive joint compound can also be formulated as a lightweight joint compound having a density, for example, in the range of about eight to about eleven pounds per gallon, as opposed to about eleven to about fourteen pounds per gallon for conventional weight joint compounds. Table II below shows general ranges of ingredients for preferred lightweight joint compounds of the invention.

TABLE II

LIGHTWEIGHT JOINT COMPOUND

| Ingredient | Weight Percentage |
| --- | --- |
| Water | 20–30 |
| Preservative | 0.01–1.0 |
| Retarder | 0.01–1.0 |
| Calcium Sulfate Hemihydrate | 10.0–100 |
| Limestone (Filler) | 10.0–50.0 |
| Attagel Clay (non-leveling agent) | 0.5–4.0 |
| Perlite (Lightweight Filler) | 1.00–10.0 |
| Thickener(s) | 0.10–1.0 |
| Latex (Binder) | 1.00–4.0 |
| Accelerator | 0.01–2.0 |
| Mica | 1–4 |
| Talc | 0.5–3 |

It has been found that the inventive joint compound has reduced water absorption, therefore less water is required to be used in the original mix, when compared to conventional ready-mixed joint compounds. For example, conventional ready mix typically uses about 33–34 weight percent water, while the joint compounds of the invention preferably use about 29 to about 31 weight percent water in the original mix. This facilitates a reduction in shrinkage of the inventive joint compounds.

In Table III below are shown two exemplative formulations of the invention falling within the ranges disclosed above. The formulation of Example 1 has a density of about 13.4, and the formulation of Example 2 has a density of about 13.2.

TABLE III

| Ingredient | Example 1 Wt. % | Example 2 Wt. % |
|---|---|---|
| Calcined Gypsum (Hemihydrate) | 59.77 | 59.77 |
| Polyvinyl Alcohol | 1.0 | 1.0 |
| Methocel 240S | 0.35 | 0.35 |
| Talc Tc-100 | 3.0 | 3.0 |
| Attagel M8113 | 2.0 | 2.0 |
| Colloids 231 (Copolymer) | 0.5 | 0.5 |
| Glycol | 0.1 | 0.10 |
| Dicaperl HP 610 | — | 0.15 |
| Water | 33.2 | 33.0 |

The viscosity of the joint compound of Example I is in the range of about 490 BU (brabender units) to about 550 BU, and the viscosity of the joint compound of Example II is in the range of about 550 BU to about 600 BU. (As will be understood by those of skill in the art, the viscosity of the joint compounds is at the lower end of the above ranges after remixing.) The viscosity of conventional weight joint compounds of the invention is generally in the range of about 400 to about 700 BU, whereas the viscosity of the lightweight joint compounds will generally be in the range of about 350 BU to about 700 BU.

The lightweight filler used in the inventive lightweight joint compounds can be a silicone or silane treated expanded perlite. Suitable perlites are available from Silbrico Corp. of Hodgkins, Ill. and Grefco Inc. of Torrance, Calif. The lightweight joint compound preferably also includes talc and/or mica as secondary fillers.

The binder provides sufficient bond strength and better adhesion of the joint compound to the substrate (e.g., wallboard). The binder is preferably a latex or polyvinyl alcohol. Preferred latex binders are sold by Air Products and Chemicals Inc. of Allentown, Pa. under the trade names Airflex 526, Airflex 528, and Reichhold Chemicals Inc. of Research Triangle Park, N.C. under the name Reichhold 40716. Polyvinyl alcohol is also available from Air Products and Chemicals Inc. Suppliers of suitable latex also include: National Starch of Bridgewater, N.J. and Fuller Chemical Company of St. Paul, Minn.

Mica suitable for use with the invention is available, for example, from Sparton Mica Company of Pacolet, S.C. and Franklin Minerals of Nashville, Tenn.

Suitable preservatives are sold, for example, under the trade names Troysan 364 and Troysan 174 by Troy Chemicals of East Hanover, N.J.

Clay Attagel M8113, a preferred non-leveling agent, is supplied from Engelhard Corp. of Iselin, N.J. Supergel B available from Millwhite Company of Houston, Tex. is an alternative to Attagel M8113.

An example of a preferred embodiment of the invention will now be described in conjunction with the production of a setting-type, ready-mixed joint compound.

EXAMPLE III

In Example III, a joint compound was made in accordance with the inventive method on a commercial scale. The ingredients used in making the joint compound are shown in Table IV-A below.

TABLE IV-A

FORMULATION OF EXAMPLE III

| Ingredient | Weight in Pounds |
|---|---|
| Water | 1775 |
| Troysan 174 | 3 |
| Troysan 364 | 0.5 |
| Defoamer [Nopco 9201] | 3 |
| Colloid 231 | 16 |
| Gauging Stucco | 1450 |
| Limestone | 2400 |
| Clay 8113 | 50 |
| Mica 5290 | 100 |
| Methocel 240S | 20 |
| Polyvinyl Alcohol | 20 |
| Preblend of Glycol (22 lbs.) and Flocculent (0.5 lbs.) | 22.5 |
| Latex | 50 |
| TOTAL | 5910 |

The defoamer, Troysan 174/364, Methocel 240s (thickener), latex (Ucar 133), polyvinyl alcohol, flocculent, glycol, and Colloid 231 (retarder) were pre-weighed and then set aside. The pre-weighed amount of flocculent was added to the pre-weighed glycol, followed by mixing for several minutes. Approximately five gallons of water were added, followed by mixing for several minutes.

In a mixing operation (using dust collector apparatus), 160 gallons of water were added to the mixing apparatus while mixing, followed by the addition of the defoamer, Colloid 231, and preservatives to the mixer. Mixing was continued for about two minutes.

The following was added to a hog feeder (a hopper having a screw conveyor which carries the materials to the mixer) in the following order: calcium sulfate hemihydrate, mica, methocel 240S (thickener), polyvinyl alcohol, and the clay attagel M8113. The hog feeder and limestone feeding apparatus were started.

After all of the dry ingredients are added to the mixer, stirring was continued for five minutes. The flocculent preblend (described above) was then added, followed by stirring for an additional three minutes. The latex was added followed by stirring for three minutes. Water was then added to achieve the final desired viscosity (between 400 and 700 BU). The product was then transferred to a holding tank.

The joint compound of Example III was found to have the properties listed below.

TABLE IV-B

| Property | Value |
|---|---|
| Density | 13.2 lbs./gallon |
| Final Viscosity | 650 cps |
| Open Time (Without Accelerator) | 15 minutes |
| Shelf Life | about two years |
| Setting Time With Accelerator | 10 minutes to 120 minutes |

EXAMPLE IV

Another resin formulation was made in accordance with the method described above. The ingredients used in making the resin of Example IV are shown in Table V-A below, along with approximate amounts.

TABLE V-A

EXAMPLE IV

| Ingredient | Weight in Pounds |
|---|---|
| Water | 5767 |
| Troysan 174 | 11 |
| Troysan 364 | 1 |
| Defoamer [Nopco 9201] | 10 |
| Colloid 231 | 52 |
| Gauging Stucco | 4700 |
| Limestone | 7800 |
| Clay 8113 | 162 |
| Mica 5290 | 325 |
| Methocel 240S | 65 |
| Polyvinyl Alcohol | 65 |
| Preblend of Glycol (72 lbs.) and Flocculent (1.5 lbs.) | 73.5 |
| Latex | 162 |
| TOTAL | 19,193.5 |

The joint compound of Example IV was found to have the properties listed in the table below.

TABLE V-B

| Property | Value |
|---|---|
| Density | 14.0 lbs./gallon |
| Final Viscosity | 700 BU |
| Open Time (Without Accelerator) | 15 minutes |
| Setting Time With Accelerator | 10 minutes to 120 minutes |

EXAMPLE V

Another joint compound was made in accordance with the formulation shown in Table VI below.

TABLE VI

EXAMPLE V

| Ingredient | Weight in Pounds |
|---|---|
| Water | 5800 |
| Troysan 174 | 5.5 |
| Troysan 364 | 1 |
| Defoamer | 5.5 |
| Retarder (Colloid 231) | 54 |
| Gauging Stucco (100 mesh screened) | 4550 |
| Limestone | 7700 |
| Attagel Clay | 150 |
| Mica | 300 |
| Thickener (Methocel 240S) | 50 |
| Binder (Polyvinyl Alcohol) | 50 |
| Glycol | 60 |
| Flocculent (Separan) | 3 |
| Latex (UCAR 133) | 125 |
| TOTAL | 18,854 |

EXAMPLE VI

In order to test the application properties of the invention, two joint compounds were made according to the following formulations. The joint compound of Example VI-A (Table VII) was a conventional weight joint compound, and the joint compound of Example VI-B (Table VIII) was a lightweight joint compound.

TABLE VII

EXAMPLE VI-A

| Ingredient | Weight Percent | Weight in Pounds |
|---|---|---|
| Water | 30.1 | 135 |
| Troysan 174 | 0.05 | 0.225 |
| Troysan 364 | 0.009 | 0.09 |
| Defoamer | 0.05 | 0.2 |
| Retarder (Colloid 231) | 0.271 | 1.22 |
| Calcium Sulfate Hemihydrate (Stucco) | 24.5 | 110 |
| Limestone | 40.0 | 180 |
| Clay (Attagel 8113) | 0.85 | 3.83 |
| Mica | 1.70 | 7.65 |
| Thickener (Methocel) | 0.34 | 1.53 |
| Binder (PVOH) | 0.34 | 1.53 |
| Ethylene Glycol | 0.38 | 1.71 |
| Flocculent (Reten) | 0.016 | 0.071 |
| TOTAL | 98.6 | 443.06 |

TABLE VIII

EXAMPLE VI-B

| Ingredient | Weight Percent | Weight in Pounds |
|---|---|---|
| Diethylene Glycol | .058 | 1.9 |
| Water | 26.85 | 94 |
| Defoamer | 0.085 | .152 |
| Troysan 364 | 0.025 | .08 |
| Troysan 174 | 0.05 | .16 |
| Retarder (Colloid 231) | 0.245 | .76 |
| Stucco (-100 mesh) | 28.57 | 100 |
| Limestone | 27.14 | 95 |
| Mica | 1.23 | 4.3 |
| Clay (Attagel 8113) | 1.23 | 4.3 |
| Perlite (Silbrico 43-23) | 3.43 | 12 |
| Thickener (Methocel 40320) | 0.48 | 1.7 |
| Latex | 3.65 | 12.8 |
| Water | 6.9 | 24.4 |
| TOTAL | 99.94 | 351.55 |

Five batches of each joint compound of Example VI were made in accordance with the invention. The joint compound of Example VI-A was found to have the following properties: viscosity—630 BU, shrinkage upon setting—3.0%, solids—67.00%, and density—13.6 lbs./gallon. The joint compound of Example VI-B was found to have the following properties: viscosity 490 BU, viscosity after 24 hours—520 BU, shrinkage upon setting 2.4%, solids—60%, and density—10.7 lbs./gallon.

In order to test application properties of the joint compound, the compound was applied on wallboard by seven different applicators at a manufactured housing plant. The following comments concerning the joint compound were made during testing:

mixes easily with accelerator easy to apply uniform consistency set time easily adjusted with accelerator less waste than with current dry powder joint compound cleaner work area high coverage The product was able to provide quick set times, smooth finishing, and more coverage when compared to the powder setting joint compound sold commercially by the assignee of this application.

The setting time of the batches was consistently about 10 minutes. No visible signs of cracks or shrinkage was observed for the joint compounds.

Shrinkage of the inventive joint compound is often about 2 weight percent. The following table compares the typical shrinkage properties of the inventive ready-mixed setting joint compound compared to commercially available all purpose ready mix joint compounds. Shrinkage varies with various conditions, such as drying temperature, humidity, particle size of the fillers, and raw material properties.

TABLE IX

| | SHRINKAGE PROPERTIES | | | |
|---|---|---|---|---|
| | INVENTION WITH USE OF ACCELERATOR | INVENTION WITHOUT ACCELERATOR | CONVENTIONAL COMMERCIAL READY MIX | CONVENTIONAL DRY POWDER SETTING TYPE |
| HIGH | 4 wt. % | 15 wt. % | 20 wt. % | 15 wt. % |
| AVE. | 3 wt. % | 14 wt. % | 18 wt. % | 12 wt. % |
| LOW | 2 wt. % | 12 wt. % | 16 wt. % | 10 wt. % |

All of the applicators preferred the joint compound of the invention over the setting powder joint compound commercially available from the present assignee.

The joint compounds of the invention have several advantages over known joint compounds. First, it has been found that the inventive joint compound, when used with one of the accelerators of the invention, can allow for a very quick set time, for example about ten to about fifteen minutes, while also providing high strength and storage stability.

The reduced setting (and drying) time of the joint compound is one of the major advantages of the invention. The short set time of the inventive joint compound makes it especially suitable for use in manufactured housing plants, where joint compound set time is particularly crucial. The short set time also allows for completion of multiple coats of joint compound at a job site in one day, whereas drying joint compounds of the prior art can require delays of hours or days between coats. There is a substantial decrease in the time required for drywall finishing, and many jobs can be finished in one day.

Further, the inventive joint compound is less brittle and more flexible than many prior art joint compounds. This property also makes the invention particularly suitable for use in manufactured housing because transporting manufactured houses can often result in cracks in the areas of application of joint compound. In moving or transporting the manufactured houses having walls made with the inventive joint compound, there should be little or no cracking.

Other advantages of the inventive joint compound include improved application characteristics, excellent adhesive properties, excellent coating properties, and reduced shrinkage, compared to conventional dry powder setting joint compounds and conventional ready mix joint compound.

The application properties (including wet tack, featherability, and stability) of the inventive joint compounds have been found to be excellent.

Because the adhesive joint compound of the invention can be made to harden quickly, there not only is a substantial decrease in the time required for gypsum drywall construction but there also is less shrinkage, especially that of the delayed type associated with the use of conventional ready mixed joint compounds. This significantly reduces the expense and time required for refinishing or redecorating surfaces when such problems are encountered.

The inventive joint compound can also serve to reduce the number of coats of joint compound required to finish a job, for example reducing from 3 to 2.

The setting time of the inventive joint compounds is in the range of about 10 minutes to about 120 minutes depending, for example, upon the particular formulation and the ambient conditions. A joint compound having a setting time of less than 10 minutes can be formulated from the disclosure of the present invention; however, such setting times are generally not required in commercial joint compound application.

The open time of the inventive joint compounds depends on whether an accelerator is used. The accelerated joint compound should be used, however, within the setting times discussed herein. The non-accelerated joint compounds of the invention have open times similar to conventional ready-mix joint compounds, e.g., 10 to 20 minutes.

Because it is ready-mixed, the inventive joint compound reduces mixing time, improves product quality control at job sites, and reduces the time required for on-site applicator consultation. Soaking time of dry powder setting-type joint compound (the time that it is generally required to wait between mixing a dry powder and using it) is also eliminated. The joint compounds of the invention also provide a superior bond to the substrate, when compared with conventional joint compounds.

The joint compound formulations disclosed herein can be used as either a ready-mixed drying type joint compound, or can be easily mixed with the accelerator without the need for additional water. Even when the joint compound is used as a drying type joint compound without the accelerator, the joint compound can provide good crack resistance with low shrinkage.

The foregoing detailed description is given for clearness of understanding only, and no unnecessary limitations should be understood therefrom, as modifications within the scope of the invention will be apparent to those skilled in the art.

What is claimed is:

1. A settable, ready-mixed joint compound composition suitable for use in concealing joints between edges of adjacent wallboard panels, said joint compound composition comprising:

(a) calcium sulfate hemihydrate;

(b) sufficient water to adjust the viscosity of said composition;

(c) a set-retarding agent comprising a polymer composition including acrylic acid and acrylamide monomer units; and (d) an accelerating agent comprising a metallic salt comprising acidic cations.

2. The composition of claim 1, wherein said polymer composition is a copolymer of acrylic acid and acrylamide.

3. The composition of claim 1, wherein said polymer composition is a blend of a homopolymer of acrylic acid and a homopolymer of acrylamide.

4. The composition of claim 1, wherein said set-retarding agent is present in an amount of from about 0.6 to about 4.0 weight percent based on the weight of said calcium sulfate hemihydrate.

5. The composition of claim 4, wherein said set-retarding agent is present in an amount of from about 0.6 to about 1.4 weight percent based on the weight of said calcium sulfate hemihydrate.

6. The composition of claim 1, wherein said set-retarding agent consists essentially of a copolymer of acrylic acid and acrylamide.

7. The composition of claim 1, wherein said set-retarding agent has a molecular weight in the range of about 1700 to about 6700.

8. The composition of claim 1, wherein said accelerating agent is present in an amount of from about 0.1 to about 5.0 weight percent based on the weight of said calcium sulfate hemihydrate.

9. The composition of claim 8, wherein said accelerating agent is present in an amount of from about 0.1 to about 2.0 weight percent based on the weight of said calcium sulfate hemihydrate.

10. The composition of claim 1, wherein said accelerating agent comprises a compound selected from the group consisting of aluminum sulfate, potassium sulfate, calcium sulfate, ferric sulfate, and ferric chloride.

11. The composition of claim 1, further comprising limestone.

12. The composition of claim 1, further comprising:
limestone, a non-leveling agent, a thickener, a plasticizer, a preservative, and a binder.

13. The composition of claim 1, wherein said calcium sulfate hemihydrate consists essentially of $\alpha$-calcium sulfate hemihydrate.

14. The composition of claim 1, wherein said calcium sulfate hemihydrate consists essentially of $\beta$-calcium sulfate hemihydrate.

15. The composition of claim 1, further comprising:
(1) a lightweight filler comprising treated, expanded perlite particles and (2) mica; and
said composition has a density of about 11 pounds or less per gallon.

16. The composition of claim 11, wherein said composition has a setting time of about twenty minutes or less.

17. The composition of claim 11, wherein said composition shrinks upon setting at a rate of about 10 volume percent or less.

18. The composition of claim 11, wherein said composition shrinks upon setting at a rate of less than about 5 volume percent and has a shelf life of at least one year.

19. The composition of claim 1, further comprising calcium sulfate dihydrate.

20. The composition of claim 1, further comprising calcium sulfate dihydrate and limestone.

21. The composition of claim 2, wherein said set retarding agent has a molecular weight in the range of about 1700 to about 6700.

22. A method of concealing joints between edges of adjacent wallboard panels, said method comprising the steps of:

(A) forming a slurry of a settable cementitious composition, said slurry comprising:
(1) calcium sulfate hemihydrate;
(2) water; and
(3) a set-retarding agent comprising a polymer composition including acrylic acid and acrylamide monomer units;

(B) combining said cementitious composition with an amount of an accelerating agent for accelerating the setting of said cementitious composition, said accelerating agent comprising a metallic salt including acidic cations and said amount being in the range of about 0.1 to about 5.0 weight percent based on the weight of said calcium sulfate hemihydrate; and (C) applying the product of step (B) to one of said edges.

23. The method of claim 22, wherein said set-retarding agent is present in an amount of from about 0.6 to about 4.0 weight percent based on the weight of said calcium sulfate hemihydrate.

24. The method of claim 23, wherein:
said accelerating agent comprises a compound selected from the group consisting of aluminum sulfate, potassium sulfate, calcium sulfate, ferric sulfate, and ferric chloride.

25. The composition of claim 22, wherein said set retarding agent has a molecular weight in the range of about 1700 to about 6700.

26. A method of producing a joint compound composition suitable for concealing joints between edges of adjacent wallboard panels, said method comprising the steps of:

(a) combining, to provide a ready-mixed settable cementitious composition, (1) calcium sulfate hemihydrate; (2) sufficient water to form a slurry with said calcium sulfate hemihydrate; (3) a filler selected from the group consisting of limestone, calcium sulfate dihydrate, and mixtures thereof; and (4) a set-retarding agent comprising a polymer composition including a copolymer of acrylic acid and acrylamide; and (b) combining an accelerating agent for accelerating the setting of said cementitious composition with the product of step (a); and wherein:
said set-retarding agent is present in an amount of from about 0.6 to about 4.0 weight percent based on the weight of the calcium sulfate hemihydrate and said accelerating agent is present in an amount of from about 0.1 to about 5.0 weight percent based on the weight of said calcium sulfate hemihydrate and comprises a compound selected from the group consisting of aluminum sulfate, potassium sulfate, calcium sulfate, ferric sulfate, and ferric chloride.

27. The composition of claim 26, wherein said set retarding agent has a molecular weight in the range of about 1700 to about 6700.

* * * * *